(12) United States Patent
Wessling et al.

(10) Patent No.: US 8,321,394 B2
(45) Date of Patent: Nov. 27, 2012

(54) MATCHING A FINGERPRINT

(75) Inventors: Jens Nicholas Wessling, Ann Arbor, MI (US); Dustin James Williams, Dexter, MI (US)

(73) Assignee: Rovi Technologies Corporation, Santa Clara, CA (US)

( * ) Notice: Subject to any disclaimer, the term of this patent is extended or adjusted under 35 U.S.C. 154(b) by 211 days.

(21) Appl. No.: 12/615,586

(22) Filed: Nov. 10, 2009

(65) Prior Publication Data

US 2011/0113037 A1 May 12, 2011

(51) Int. Cl.
 *G06F 17/30* (2006.01)
(52) U.S. Cl. .................................... 707/705; 707/747
(58) Field of Classification Search .................. None
 See application file for complete search history.

(56) References Cited

U.S. PATENT DOCUMENTS

| | | | |
|---|---|---|---|
| 6,230,192 B1 | 5/2001 | Roberts et al. | |
| 6,330,593 B1 | 12/2001 | Roberts et al. | |
| 7,277,766 B1 | 10/2007 | Khan et al. | |
| 7,451,078 B2 | 11/2008 | Bogdanov | |
| 2005/0065976 A1* | 3/2005 | Holm et al. | 707/104.1 |
| 2007/0049250 A1* | 3/2007 | Chambers et al. | 455/411 |
| 2007/0192087 A1* | 8/2007 | Kim et al. | 704/200.1 |
| 2007/0288478 A1 | 12/2007 | DiMaria et al. | |
| 2010/0124335 A1 | 5/2010 | Wessling et al. | |
| 2010/0153393 A1 | 6/2010 | Wessling et al. | |
| 2010/0191739 A1 | 7/2010 | Wessling et al. | |
| 2010/0228704 A1 | 9/2010 | Kahlbaum et al. | |
| 2010/0228736 A1 | 9/2010 | Kahlbaum et al. | |
| 2010/0318493 A1 | 12/2010 | Wessling | |
| 2010/0318586 A1 | 12/2010 | Wessling | |
| 2011/0072117 A1 | 3/2011 | Wessling et al. | |

\* cited by examiner

*Primary Examiner* — Hung Q Pham
(74) *Attorney, Agent, or Firm* — Fitzpatrick, Cella, Harper & Scinto (57) ABSTRACT

A method and a system are provided for matching a fingerprint, for example, an audio fingerprint. In one example, the system receives, from a user device, a chapter and a query about the chapter. The chapter includes computer readable data generated from a waveform of an audio signal. The query is a request to receive data related to the chapter. The system generates, at a computer, a fingerprint of the chapter. The fingerprint includes at least a digital measure of certain properties of the waveform of the audio signal. The system generates, at a computer, a hash value of the fingerprint by applying a hash function to at least a portion of the fingerprint of the chapter. The hash value serves as an identifier for the fingerprint. The system looks up, in a database system, a matching hash value for the hash value of the fingerprint.

33 Claims, 8 Drawing Sheets

MATCHING A FINGERPRINT

FIELD OF THE INVENTION

The present invention relates to matching a fingerprint (e.g., audio fingerprint). More particularly, the present invention relates to matching a fingerprint by matching a hash value for the fingerprint.

BACKGROUND

Matching fingerprints may be part of a process for searching for data related to a chapter (e.g., track, song, and/or recording). Finding a match between two fingerprints (e.g., audio fingerprints) is typically a time consuming operation for some of the following reasons: a multitude of fingerprints typically must be searched; and each of the multitude of fingerprints must be searched until at least one match is found. Further, finding a match may sometimes produce an incorrect match due to the fuzzy nature of fingerprints.

SUMMARY

A chapter (e.g., track, etc.) may be identified by computing a fingerprint of the chapter and then using the fingerprint to lookup information in a database. U.S. Pat. Nos. 6,230,192 and 6,330,593 (the '192 and '593 patents), which are hereby incorporated by reference, provide conventional examples of such a method. The '192 and the '593 patents relate generally to delivering supplemental entertainment content to a user listening to a musical recording. Using conventional techniques, a fingerprint is computed for the musical recording being played. The fingerprint is used to retrieve, from a database, information relating to the recording played by the user. A conventional server may receive a chapter (e.g., track, song, and/or recording) and a query about the chapter. The conventional server attempts to satisfy the query. The conventional system may compute a fingerprint (e.g., audio fingerprint) for the chapter. The conventional server uses the fingerprint as a key to lookup at least one matching record in a database. The conventional server outputs the data stored in that matching record. Unfortunately, conventional systems do not account for some of the obstacles related to matching a fingerprint.

In a first embodiment, a method is provided for matching a fingerprint. The method comprises the following: receiving, from a user device, a chapter and a query about the chapter, wherein the chapter includes computer readable data generated from a waveform of an audio signal, and wherein the query is a request to receive data related to the chapter; generating, at a computer, a fingerprint of the chapter, wherein the fingerprint includes at least a digital measure of certain properties of the waveform of the audio signal; generating, at a computer, a hash value of the fingerprint by applying a hash function to at least a portion of the fingerprint of the chapter, wherein the hash value serves as an identifier for the fingerprint; and looking up, in a database system, a matching hash value for the hash value of the fingerprint.

In a second embodiment, a system is provided for matching a fingerprint. The system is configured for the following: receiving, from a user device, a chapter and a query about the chapter, wherein the chapter includes computer readable data generated from a waveform of an audio signal, and wherein the query is a request to receive data related to the chapter; generating, at a computer, a fingerprint of the chapter, wherein the fingerprint includes at least a digital measure of certain properties of the waveform of the audio signal; generating, at a computer, a hash value of the fingerprint by applying a hash function to at least a portion of the fingerprint of the chapter, wherein the hash value serves as an identifier for the fingerprint; and looking up, in a database system, a matching hash value for the hash value of the fingerprint.

In a third embodiment, a computer readable medium comprises one or more instructions for matching a fingerprint. The one or more instructions are configured to cause one or more processors to perform the following steps: receiving, from a user device, a chapter and a query about the chapter, wherein the chapter includes computer readable data generated from a waveform of an audio signal, and wherein the query is a request to receive data related to the chapter; generating, at a computer, a fingerprint of the chapter, wherein the fingerprint includes at least a digital measure of certain properties of the waveform of the audio signal; generating, at a computer, a hash value of the fingerprint by applying a hash function to at least a portion of the fingerprint of the chapter, wherein the hash value serves as an identifier for the fingerprint; and looking up, in a database system, a matching hash value for the hash value of the fingerprint.

In some embodiments, the database system is configured to be coupled to a user device. The user device may be configured to retrieve metadata from the database and to display the metadata. The user device may be, for example, a laptop computer, a CD player, a DVD player, a Blu-ray Disc player, a smart phone, a cell phone, a personal media device, a portable media player, an iPod™, a Zune™ Player, a palmtop computer, a mobile phone, an mp3 player, a digital audio recorder, and/or a digital video recorder.

In some embodiments, the database is configured to be coupled to a server that is accessible to a user device over a network. The server may be configured to retrieve, from the database, data related to the chapter. The user device may be configured to display the metadata.

In some embodiments, the hash value is an identifier that allows the chapter to be identified without interpreting the fingerprint corresponding to the hash value. The hash value may be in a standard format and is preferably smaller than the fingerprint corresponding to the hash value.

The invention encompasses other embodiments configured as set forth above and with other features and alternatives. It should be appreciated that these embodiments may be implemented in numerous ways, including as a method, a process, an apparatus, a system or a device.

BRIEF DESCRIPTION OF THE DRAWINGS

The inventive embodiments will be readily understood by the following detailed description in conjunction with the accompanying drawings. To facilitate this description, like reference numerals designate like structural elements.

DETAILED DESCRIPTION

An invention is disclosed for a method and a system for matching a fingerprint. Numerous specific details are set forth in order to provide a thorough understanding of various embodiments. It will be understood, however, to one skilled in the art, that the embodiments may be practiced with other specific details.

DEFINITIONS

Some terms are defined below in alphabetical order for easy reference. These terms are not rigidly restricted to these definitions. A term may be further defined by its use in other sections of this description.

"Album" means a collection of tracks. An album is typically originally published by an established entity, such as a recording label (e.g., recording company, such as Warner or Universal).

"Blu-ray", also known as Blu-ray Disc, means a disc format jointly developed by the Blu-ray Disc Association, and personal computer and media manufacturers (including Apple, Dell, Hitachi, HP, NC, LG, Mitsubishi, Panasonic, Pioneer, Philips, Samsung, Sharp, Sony, TDK and Thomson). The format was developed to enable chapter, rewriting and playback of high-definition video (HD), as well as storing large amounts of data. The format offers more than five times the storage capacity of conventional DVDs and can hold 25 GB on a single-layer disc and 800 GB on a 20-layer disc. More layers and more storage capacity may be feasible as well. This extra capacity combined with the use of advanced audio and/or video codecs offers consumers an unprecedented HD experience. While current disc technologies, such as CD and DVD, rely on a red laser to read and write data, the Blu-ray format uses a blue-violet laser instead, hence the name Blu-ray. The benefit of using a blue-violet laser (605 nm) is that it has a shorter wavelength than a red laser (650 nm). A shorter wavelength makes it possible to focus the laser spot with greater precision. This added precision allows data to be packed more tightly and stored in less space. Thus, it is possible to fit substantially more data on a Blu-ray Disc even though a Blu-ray Disc may have substantially similar physical dimensions as a traditional CD or DVD.

"Chapter" means audio and/or visual data block for playback. A chapter preferably includes without limitation computer readable data generated from a waveform of an audio and/or visual signal (e.g., audio/visual data). Examples of a chapter include without limitation an audio track, a video track, a song, a book chapter, magazine chapter, a publication chapter, a CD chapter, a DVD chapter and/or a Blu-ray Disc chapter.

"Compact Disc" (CD) means a disc used to store digital data. A CD was originally developed for storing digital audio. Standard CDs have a diameter of 740 mm and can typically hold up to 80 minutes of audio. There is also the mini-CD, with diameters ranging from 60 to 80 mm. Mini-CDs are sometimes used for CD singles and typically store up to 24 minutes of audio. CD technology has been adapted and expanded to include without limitation data storage CD-ROM, write-once audio and data storage CD-R, rewritable media CD-RW, Super Audio CD (SACD), Video Compact Discs (VCD), Super Video Compact Discs (SVCD), Photo CD, Picture CD, Compact Disc Interactive (CD-i), and Enhanced CD. The wavelength used by standard CD lasers is 650 nm, and thus the light of a standard CD laser typically has a red color.

"Database" means a collection of data organized in such a way that a computer program may quickly select desired pieces of the data. A database is an electronic filing system. In some implementations, the term "database" may be used as shorthand for "database management system".

"Device" means software, hardware or a combination thereof. A device may sometimes be referred to as an apparatus. Examples of a device include without limitation a software application such as Microsoft Word™, a laptop computer, a database, a server, a display, a computer mouse, and a hard disk.

"Digital Video Disc" (DVD) means a disc used to store digital data. A DVD was originally developed for storing digital video and digital audio data. Most DVDs have substantially similar physical dimensions as compact discs (CDs), but DVDs store more than six times as much data. There is also the mini-DVD, with diameters ranging from 60 to 80 mm. DVD technology has been adapted and expanded to include DVD-ROM, DVD-R, DVD+R, DVD-RW, DVD+RW and DVD-RAM. The wavelength used by standard DVD lasers is 650 nm, and thus the light of a standard DVD laser typically has a red color.

"Fingerprint" (e.g., "audio fingerprint", "acoustic fingerprint" or "digital fingerprint") is a digital measure of certain properties of a waveform of an audio and/or visual signal (e.g., audio/visual data). An audio fingerprint is typically a fuzzy representation of an audio waveform generated by applying preferably a Fast Fourier Transform (FFT) to the frequency spectrum contained within the audio waveform. An audio fingerprint may be used to identify an audio sample and/or quickly locate similar items in an audio database. An audio fingerprint typically operates as an identifier for a particular item, such as, for example, a track, a song, a recoding, an audio book, a CD, a DVD and/or a Blu-ray Disc. An audio fingerprint is an independent piece of data that is not affected by metadata. The company Rovi™ Corporation has databases that store over 25 million unique fingerprints for various audio samples. Practical uses of audio fingerprints include without limitation identifying songs, identifying recordings, identifying melodies, identifying tunes, identifying advertisements, monitoring radio broadcasts, monitoring peer-to-peer networks, managing sound effects libraries and/or identifying video files.

"Fingerprinting" is the process of generating a fingerprint for an audio and/or visual waveform. U.S. Pat. No. 7,277,766 (the '766 patent), entitled "Method and System for Analyzing Digital Audio Files", which is herein incorporated by reference, provides an example of an apparatus for audio fingerprinting an audio waveform. U.S. Pat. No. 7,451,078 (the '078 patent), entitled "Methods and Apparatus for Identifying Media Objects", which is herein incorporated by reference, provides an example of an apparatus for generating an audio fingerprint of an audio chapter. U.S. patent application Ser. No. 12/456,177 (the '177 patent application), by Jens Nicholas Wessling, entitled "Managing Metadata for Occurrences of a Chapter", which is herein incorporated by reference, provides an example of identifying metadata by storing an internal identifier (e.g., fingerprint) in the metadata.

"Hashing" means applying a hash function to specified data. A hash function is a procedure or mathematical function which converts a large, possibly variable-sized amount of data into a smaller amount of data. Examples of a hash function include without limitation any MD (Message-Digest Algorithm), MD2 (Message-Digest Algorithm 2), MD3 (Message-Digest Algorithm 3), MD4 (Message-Digest Algorithm 4), MD5 (Message-Digest Algorithm 5) and MD6 (Message-Digest Algorithm 6). A value returned by a hash function is called a hash value, a hash code, a hash sum, or simply a hash. Hash functions are mostly used to speed up table lookup or data comparison tasks, such as finding items in a database, detecting duplicated or similar records in a large file, and so on. A hash lookup, by using a hash table, preferably has a computational complexity of about O(1) time. O(1) time, refers to the computation time of a problem when the time needed to solve that problem is bounded by a value that does not depend on the size of the data it is given as input. For example, accessing any single element (e.g., hash value) in an array (e.g., hash table) takes about O(1) time, as only one operation has to be made to locate the element. For instance, during a hash lookup, the hash value itself indicates exactly where in memory the hash value is supposed to be; the hash value is either there or not there. A hash value is a number that may be represented in a standardized format, such as, for example, a 128-bit value or a 32-digit hexadecimal number. The length of the hash value is determined by the type of algorithm used. The length of the hash value preferably depends on the number of entries in the system, and does not depend on the size of the value being hashed. Every pair of non-identical files will likely translate into a different hash value, even if the two files differ only by a single bit. Each time a particular file is hashed by using the same algorithm, the exact same, or substantially similar, hash value will be generated. A hash value may serve as an identifier of a chapter (e.g., track).

"Identifier" means a signature that identifies an item, such as, for example, a track, a song, a recording, a volume, an album, a CD, a DVD, a Blu-ray Disc, a book, a magazine and/or a publication, among other items. Examples of an identifier include without limitation the following in a computer-readable format: an audio fingerprint, a portion of an audio fingerprint, a hash value derived from an audio fingerprint, an audio identifier, a video identifier, a disc identifier, a CD identifier, a DVD identifier, a Blu-ray Disc identifier, a media identifier, a high definition media identifier, a human fingerprint, a human footprint, an animal fingerprint, an animal footprint, a handwritten signature, an eye print, a biometric identifier, a retinal identifier, a retinal scan, a DNA identifier, a DNA profile, a genetic identifier and/or a genetic profile, among other identifiers. An identifier may be any computer-readable string of characters that comports with any coding standard in any language. Examples of a coding standard include without limitation alphabet, alphanumeric, decimal, hexadecimal, binary, American Standard Code for Information Interchange (ASCII), Unicode and/or Universal Character Set (UCS). Certain identifiers may not initially be computer-readable. For example, latent human fingerprints may be printed on a door knob in the physical world. An Identifier that is initially not computer-readable may be converted into a computer-readable identifier by using any appropriate conversion technique. For example, a conversion technique for converting a latent human fingerprint into a computer-readable identifier may include a ridge characteristics analysis.

"MD5" is Message-Digest algorithm 5 hash function. The MD5 function processes a variable-length message into a fixed-length output of 128 bits. The input message is broken up into chunks of 512-bit blocks (sixteen 32-bit little endian integers). The message is padded so that its length is divisible by 512. The padding works as follows: first a single bit, 1, is appended to the end of the message. This single bit is followed by as many zeros as are required to bring the length of the message up to 64 bits fewer than a multiple of 512. The remaining bits are filled up with a 64-bit integer representing the length of the original message, in bits. The main MD5 algorithm operates on a 128-bit state, divided into four 32-bit words, denoted A, B, C and D. These are initialized to certain fixed constants. The main MD5 algorithm then operates on each 512-bit message block in turn, each block modifying the state. The processing of a message block comprises four similar stages, termed rounds. Each round is composed of 16 similar operations based on a non-linear function F, modular addition, and left rotation.

"Metadata" generally means data that describes data. More particularly, metadata means data that describes the contents of a digital audio and/or video recording. for example, metadata may include without limitation movie title, actors names, director name, and/or genre of movie (e.g., horror, drama or comedy).

"Network" means a connection between any two or more computers, which permits the transmission of data. A network may be any combination of networks, including without limitation the Internet, a local area network, a wide area network, a wireless network and a cellular network.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"Song" means a musical composition. A song is typically recorded onto a track by a recording label (e.g., recording company). A song may have many different versions, for example, a radio version and an extended version.

"System" means a device or multiple coupled devices. A device is defined above.

"Track" means an audio and/or visual chapter. A track may be on a disc, such as, for example, a Blu-ray Disc, a CD or a DVD.

"User" means a consumer, client, and/or client device in a marketplace of products and/or services.

"User device" (e.g., "client", "client device" or "user computer") is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a laptop computer, a CD player, a DVD player, a Blu-ray Disc player, a smart phone, a cell phone, a personal media device, a portable media player, an iPod™, a Zune™ Player, a palmtop computer, a mobile phone, an mp3 player, a digital audio recorder, a digital video recorder, an IBM-type personal computer (PC) having an operating system such as Microsoft Windows™, an Apple™ computer having an operating system such as MAC-OS, hardware having a JAVA-OS operating system, and/or a Sun Microsystems Workstation having a UNIX operating system.

"Volume" means a group of chapters of audio and/or visual data for playback. A volume may be referred to as an album, a movie, a CD, a DVD, and/or a Blu-ray Disc, among other things.

"Web browser" means any software program which can display text, graphics, or both, from Web pages on Web sites. Examples of a Web browser include without limitation Mozilla Firefox™ and Microsoft Internet Explorer™.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo™ Web server.

"Web site" means at least one Web page, and more commonly a plurality of Web pages, virtually coupled to form a coherent group.

I

Preliminary Processing: Generating Hash Values for Fingerprints

Figure 1:
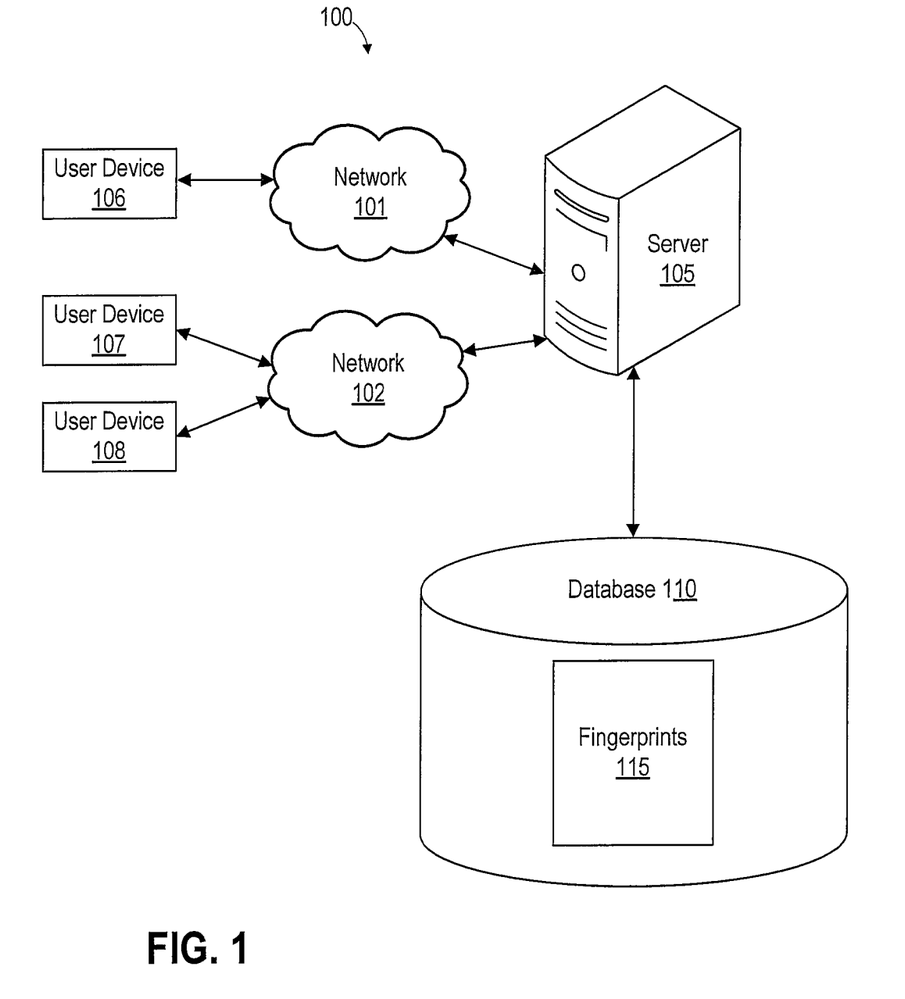
FIG. 1 is a block diagram of a system for generating hash values for fingerprints, in accordance with some embodiments.

FIG. 1 is a block diagram of a system 100 for generating hash values for fingerprints, in accordance with some embodiments. The system 100 includes without limitation a server 105 and a database 110. The server 105 may be a server system that includes without limitation an application server and/or a database server.

The server 105 is preferably coupled to (or includes) the database 110. The database 110 may store, among other things, data collected and/or generated from one or more exemplary user devices 106, 107, and 108. As shown in FIG. 1, the user devices are coupled to the same network, or alternatively, to different networks. For instance, The user device 106 is illustrated as coupled to the network 101, while the user devices 107 and 108 are coupled to the network 102. The networks 101 and 102 include a variety of network types such as, for example, local area networks, wide area networks, networks of networks, the Internet, as well as home media type networks. The database 110 preferably includes fingerprints 115. The database 110 may also include data related to items, such as, for example, tracks, songs and/or recordings, among other things.

It will be readily appreciated that the schematic of FIG. 1 is for explanatory purposes, and that numerous variations are possible. For example, the system 100 may include a database (or system of databases) arranged in a configuration that is different than the database 110 depicted here. Other configurations exist as well.

Figure 2:
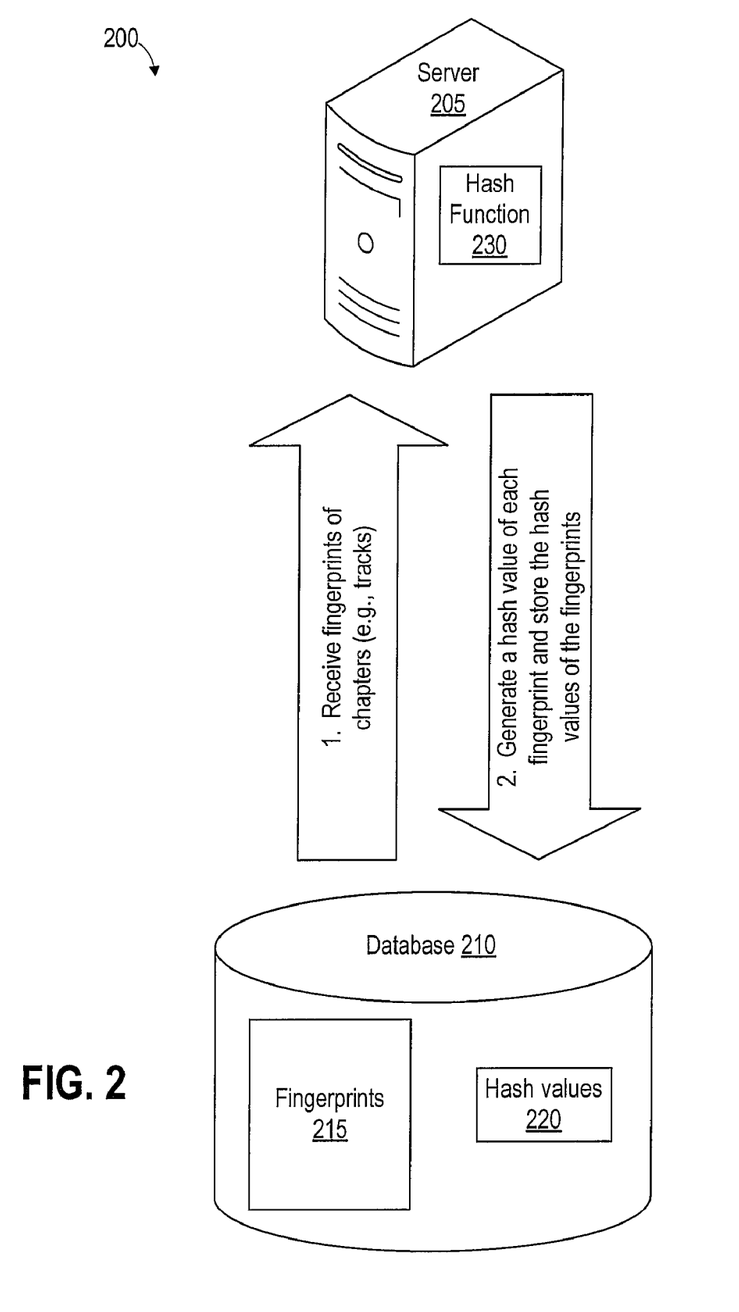
FIG. 2 is a schematic diagram of a system for generating hash values for fingerprints, in accordance with some embodiments.

FIG. 2 is a schematic diagram of a system 200 for generating hash values for fingerprints, in accordance with some embodiments. The system 200 preferably comprises a server 205 and a database 210, configured in a similar way to the system 100 of FIG. 1. The server 205 may be a server system that includes without limitation an application server and/or a database server. The database 210 preferably comprises without limitation one or more fingerprints 215. Each fingerprint serves as an identifier of a chapter (e.g., track, etc.).

The server 205 is configured for hashing each of the fingerprints 215. The server 205 preferably receives one or more fingerprints from the database 210. Alternatively, the server 205 may receive the one or more fingerprints from one or more user devices, as illustrated and described above in relation to FIG. 1. The server 205 generates a hash value 220 for each fingerprint by applying a hash function 230 to at least a portion of each fingerprint. In some embodiments, the hash function 230 includes the MD5 (Message-Digest algorithm 5) function, which is described above in relation to the description of "hashing". However, in alternative embodiments, different hash functions may be used instead, such as, for example, the MD6 (Message-Digest algorithm 6) function. The system 200 stores, in the database 210, the hash values 220 of the fingerprints 215.

Each hash value 220 serves as an identifier of a chapter. A hash value is standardized in format and substantially smaller than the corresponding fingerprint of the chapter. For example, a hash value typically includes substantially fewer bits than the number of bits used to represent the corresponding fingerprint.

Figure 3:
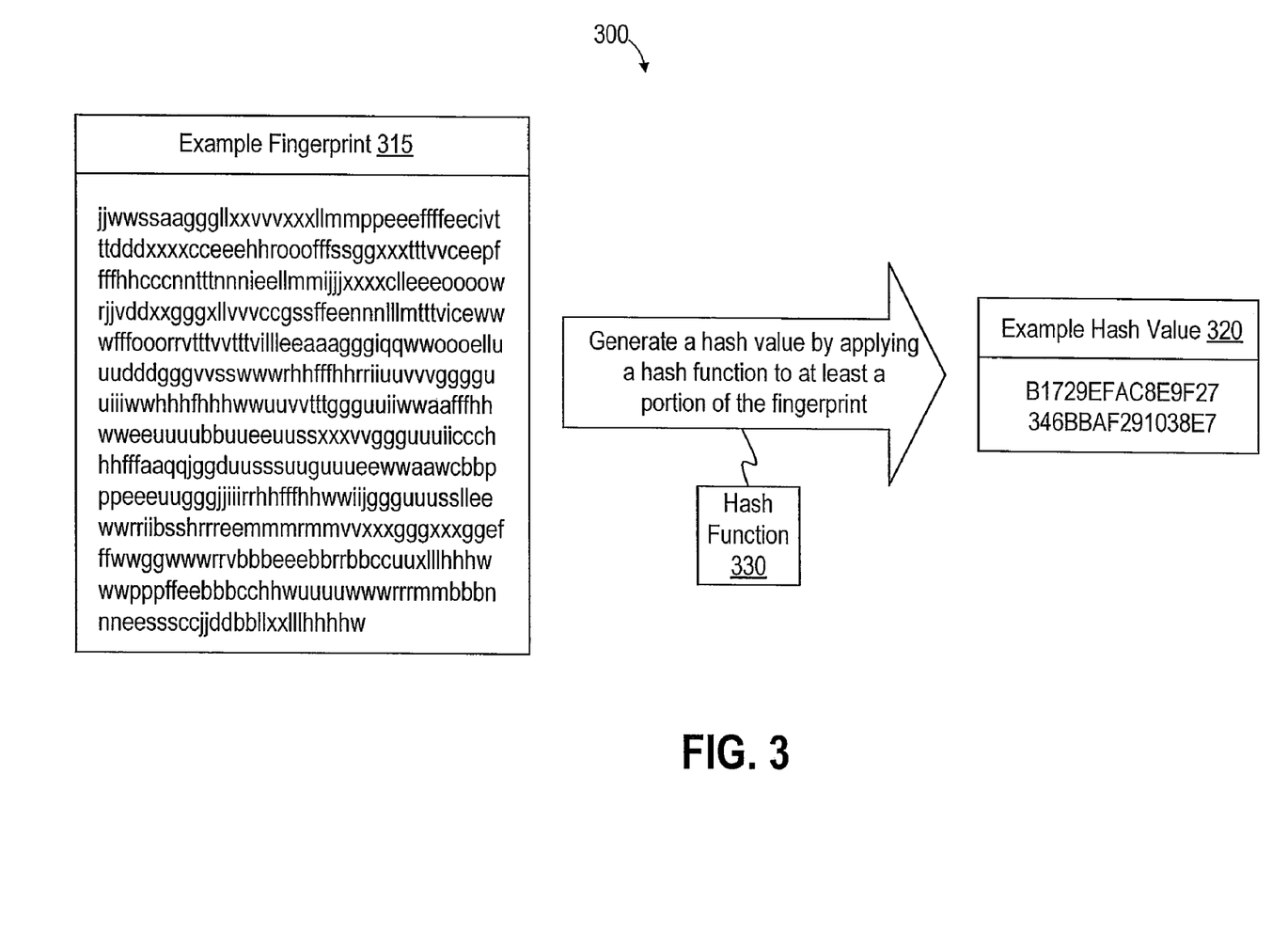
FIG. 3 is a schematic diagram of a system for generating an example hash value for an example fingerprint, in accordance with some embodiments.

FIG. 3 is a schematic diagram of a system 300 for generating an example hash value 320 for an example fingerprint 315, in accordance with some embodiments. The example fingerprint 315 is generated from a chapter (e.g., track). The example fingerprint 315 is a digital measure of certain properties of a waveform of an audio and/or visual signal (e.g., audio/visual data). An audio fingerprint is typically a fuzzy representation of an audio waveform generated by applying preferably a Fast Fourier Transform (FFT) to the frequency spectrum contained within the audio waveform. An audio fingerprint may be used to identify an audio sample and/or quickly locate similar items in an audio database. The example fingerprint 315 operates as an identifier for a particular item, such as, for example, a track, a song, a recording, an audio book, a CD, a DVD and/or a Blu-ray Disc, among other things. Identifiers, as used in this document, are defined and described in further detail above.

The system 300 generates an example hash value 320 by applying a hash function 330 to at least a portion of the example fingerprint 315. As mentioned above, in some embodiments, the hash function 330 includes the MD5 (Message-Digest algorithm 5) function, or another algorithm described above in relation to the description of hashing.

The example fingerprint 315 differs from the example hash value 320 in at least two important ways. In a first difference, the hash value 320 is substantially smaller than the corresponding fingerprint 315. The example hash value 320 is a 32-digit hexadecimal number, which requires about 128 bits (e.g., 32 characters times 4 bits/character). Other hash configurations exist as well. The length of the hash value 320 is determined by the type of hash function 330 used. The length of the hash value 320 preferably depends on the number of entries (e.g., hash values) in the system, and does not depend on the size of the value (e.g., fingerprint 315) being hashed. In contrast to hash values, fingerprints may have sizes between about 24 ASCII characters and about 600 ASCII characters, and more typically between about 300 ASCII characters and about 550 ASCII characters. Accordingly, fingerprints may have sizes between about 192 bits (e.g., 24 characters times 8 bits/character) and about 4,800 bits (e.g., 600 characters times 8 bits/character), and more typically between about 2,400 bits (e.g., 300 characters times 8 bits/character) and about 4,400 bits (e.g., 550 characters times 8 bits/character). Other fingerprint configurations exist as well. For example, it is possible for a fingerprint to be substantially larger than 600 ASCII characters. The example fingerprint 315 has about 525 ASCII characters, which is about 4,200 bits (e.g., 525 characters times 8 bits/character). Accordingly, the hash value 320 having about 128 bits is substantially smaller than the corresponding fingerprint 315 having about 4,200 bits. In the example of FIG. 3, the hash function 330 produces a standardized, concise hash value 320 that is substantially more efficient for computational purposes than a variable-sized, larger fingerprint 315.

In a second difference between the example fingerprint 315 and the example hash value 320, the exemplary hash value 320 is more efficient for database operations than is the corresponding value (e.g., the fingerprint 315). The example hash value 320 is faster at table lookups, such as finding items in a database or detecting duplicated records in a large file, and so on. A hash lookup, by using a hash table, has a computational complexity of roughly $O(1)$ (constant) time. $O(1)$ time, refers to the computational complexity of a problem when the time needed to solve that problem is bounded by a value that does not depend on the size of the data it is given as input. For example, accessing any single element, such as the example hash value 320, in an array (e.g., hash table) takes about constant time. Usually only one operation has to be made to locate the element. For instance, during a hash lookup, the example hash value 320 indicates exactly where the hash value is located in memory. Hence, the operation advantageously comprises a lookup and/or addressing type operation. In contrast, finding the example fingerprint 315, without using the hash value 320, requires the system to search through each fingerprint in the database until the example fingerprint 315 is found. This search would take, using a standard search algorithm on pre-sorted data, about $Log_2(N)$ time where N is the number of elements (e.g., fingerprints within the database) being searched. Accordingly, the hash lookup by using the generated hash value 320 of some embodiments is substantially more efficient than a search for a typical fingerprint such as the fingerprint 315 in this example.

Overview of a Method for Generating Hash Values for Fingerprints

Figure 4:
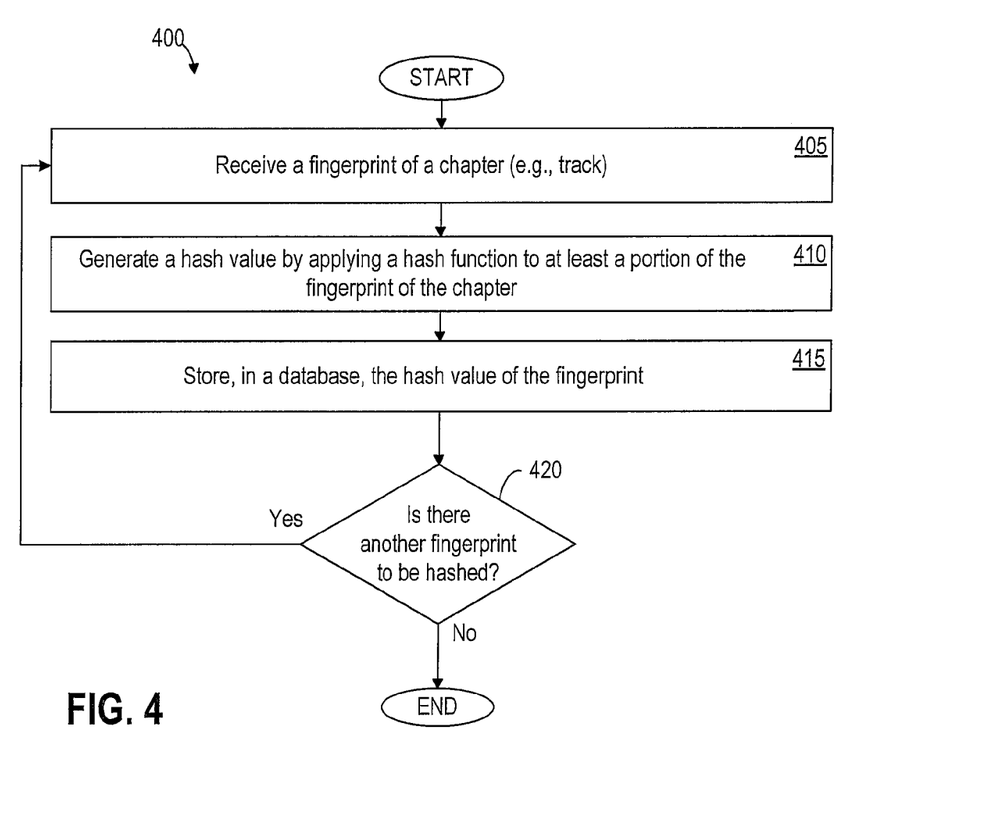
FIG. 4 is a flowchart of a method for the preliminary processing of generating hash values for fingerprints, in accordance with some embodiments.

FIG. 4 illustrates a method 400 for the preliminary processing of generating hash values for fingerprints, in accordance with some embodiments. In some implementations, the steps of the method 400 may be carried out by the server 105 of FIG. 1. In an implementation, the method 400 of FIG. 4 operates in a batch and/or scheduled mode.

The method 400 starts in a step 405 where the system receives a fingerprint of a chapter (e.g., track). The method 400 then moves to a step 410 where the system generates a hash value by applying a hash value to at least a portion of the fingerprint of the chapter. Next, in a step 415, the system stores, in a database, the hash value of the fingerprint.

The hash value is an identifier for the chapter. An identifier is useful for a variety purposes. For instance, an identifier may be used for the following purposes without limitation: retrieving data related to a particular chapter (e.g., track), playing back a particular chapter, distinguishing a particular chapter from another chapter, and matching a particular chapter to another chapter that is substantially the same.

Next, in a decision operation 420, the system determines if there is another fingerprint to be hashed. For example, the database storing the fingerprints may contain more fingerprints that need to be hashed. If another fingerprint is to be hashed, then the method 400 returns to the step 405 where the system receives another fingerprint of a chapter. For example, a server may receive another fingerprint stored in the database storing the fingerprints. However, if another fingerprint is not to be hashed, then the method 400 concludes after the decision operation 420.

Note that this method 400 may include other details and steps that are not discussed in this method overview. Other details and steps are discussed above with reference to the appropriate figures and may be a part of the method 400, depending on the embodiment.

II

Matching a Fingerprint by Matching a Hash Value for the Fingerprint

Matching a hash value may be part of a searching process for data related to a chapter (e.g., track). For example, a user device may query a database for data related to a chapter. A server may attempt to match a hash value for the chapter with a hash value stored in the database. The hash value allows the chapter to be identified without having to read the corresponding fingerprint. Given the hash value, the system may search for data related to the chapter. This data searching process is described in more detail below with reference to FIG. 5 through FIG. 7.

Figure 5:
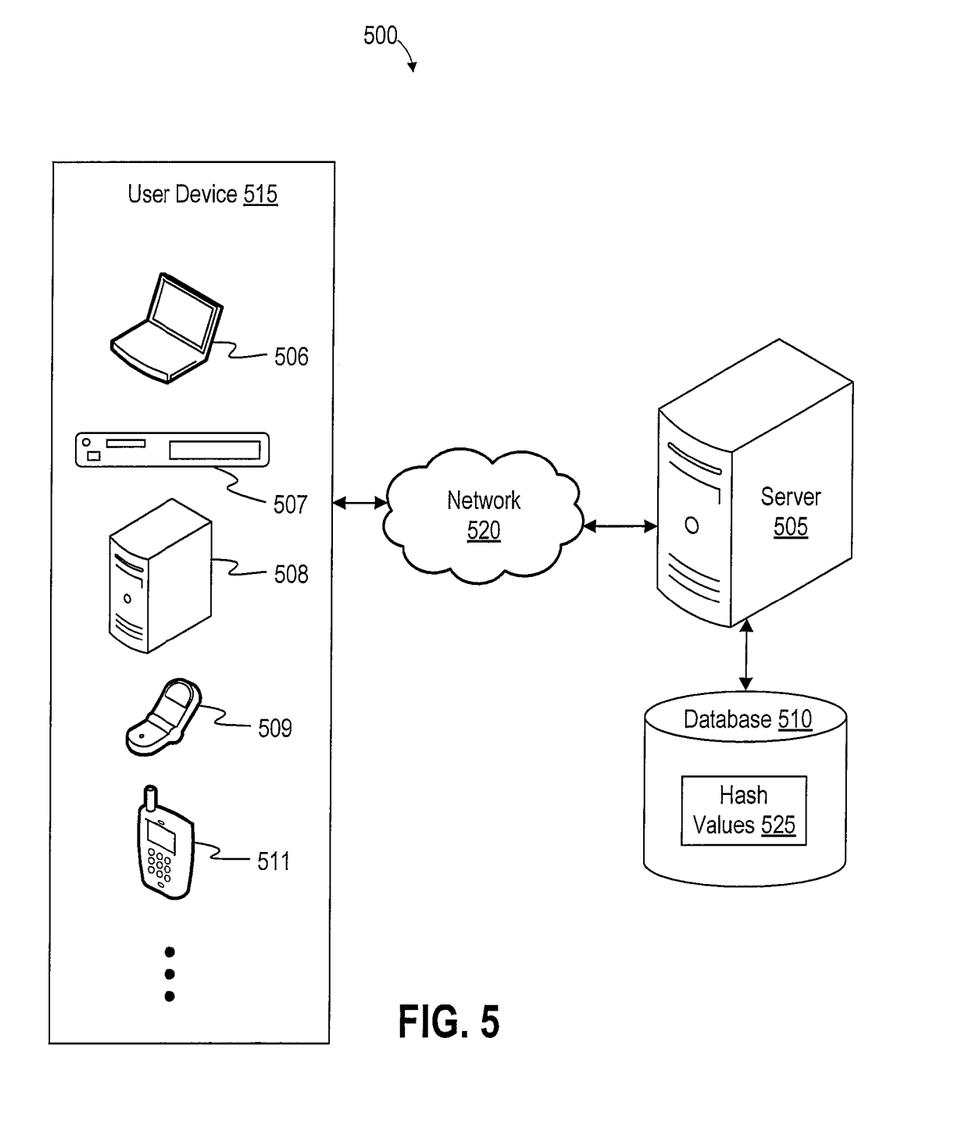
FIG. 5 is a block diagram of a system for matching a hash value for a fingerprint, in accordance with some embodiments.

FIG. 5 is a block diagram of a system 500 for matching a hash value for a fingerprint, in accordance with some embodiments. The system 100 comprises without limitation a server 505, a database 510 and a user device 515. The server 505 may be a server system that includes without limitation an application server and/or a database server. Examples of a user device 515 include without limitation a laptop computer 506, a disc player 507, a workstation 508, a cell phone 509, and/or a smart phone 511. A network 520 couples the server 505 to the user device 515.

The server 505 is preferably coupled to (or includes) the database 510. The server 505 is configured for searching, organizing and/or analyzing the database 510 in an efficient manner. The database 510 may store, among other things, data collected and/or generated from one or more user devices 515. The database preferably includes without limitation hash values 525 for fingerprints of chapters (e.g., tracks). The database 510 preferably includes preexisting hash values 525 that are previously generated, as described above with reference to FIG. 2. A hash value for a fingerprint allows a chapter to be identified without having to read the entire fingerprint corresponding to the hash value. If the database does not include preexisting hash values for the fingerprints, then the system may generate hash values for the fingerprints, as described above with reference to FIG. 2. The database 510 may also include data related to items, such as, for example, tracks, songs and/or recordings, among other things.

It will be readily appreciated that the schematic of FIG. 5 is for explanatory purposes, and that numerous variations are possible. For example, the system 500 may include a database (or system of databases) arranged in a configuration that is different than the database 510 depicted here. Other configurations exist as well.

Some or all software and data necessary for indexing and/or managing hash values may be stored on the server 505 and/or the user device 515. For example, the user device 515 may contain a subset or a complete set of the data available in the database 510 that is coupled to the server 505. The user device 515 may be loaded with data from a CD-ROM (not shown). The user device 515 may store data on a hard disk of the user device 515. Alternatively, the user device 515 may download data to the user device 515 from the database 510 via the network 520. Other configurations exist as well.

The server 505 is configured for searching data in the database 510. For example, the server 505 may be configured for looking up a match for a hash value for a fingerprint. Other examples of data exist as well. U.S. Patent Publication No. 2007/0288478 (the '478 patent publication), entitled "Method and System for Media Navigation", is hereby incorporated by reference. The '478 patent application provides an example of a method for navigating and searching through media on a database.

In some embodiments, a hash value may be referred to as a signature. The hash values (e.g., signatures) may be arranged in clusters as described in U.S. patent application Ser. No. 12/456,194 (the '194 patent application), by Jens Nicholas Wessling, entitled "Generating a Representation of a Cluster of Signatures by Using Weighted Sampling", which is herein incorporated by reference. During a search, identifying (e.g., recognizing) a cluster may occur more efficiently by searching representations of clusters, instead of the hash values within the clusters.

Identifying a chapter (e.g., track) may involve preliminary operations of generating hash values for fingerprints in a database, as discussed above with reference to FIG. 1 through FIG. 4. U.S. patent application Ser. Nos. 12/378,841 and 12/378,840 (the '841 and '840 patent applications), entitled "Recognizing a Disc", which are hereby incorporated by reference, provide examples of methods for identifying (e.g., recognizing) a disc, among other items.

Figure 6:
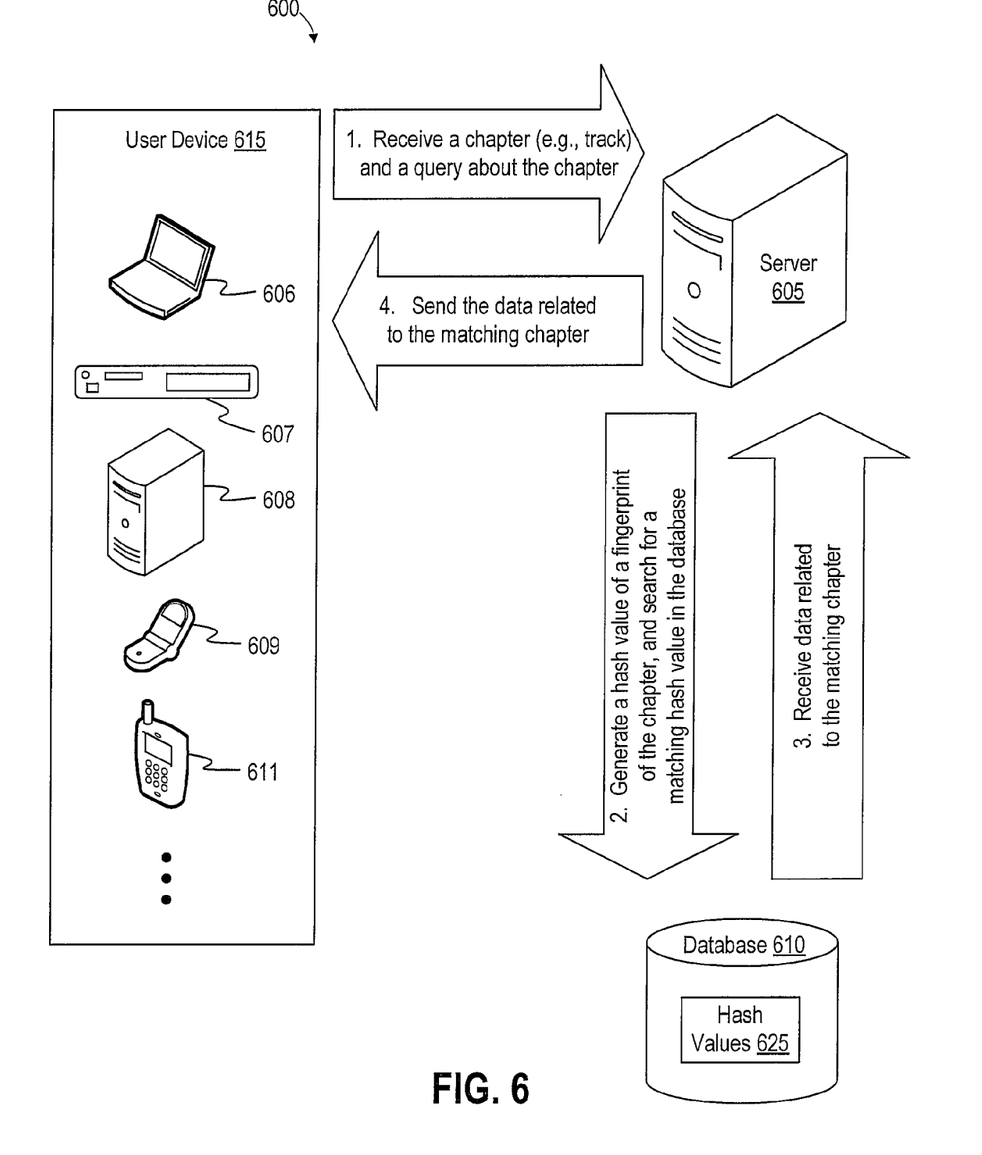
FIG. 6 is a schematic diagram of a method for matching a hash value for a fingerprint, in accordance with some embodiments.

FIG. 6 is a schematic diagram of a method 600 for matching a hash value for a fingerprint, in accordance with some embodiments. The system 600 preferably comprises a server 605, a database 610 and a user device 615, configured in a similar way to the system 500 of FIG. 5. The server 605 may be a server system that includes without limitation an application server and/or a database server. Examples of a user device 615 include without limitation a laptop computer 606, a disc player 607, a workstation 608, a cell phone 609, and/or a smart phone 611. The database 610 preferably comprises without limitation one or more hash values 625. Each hash value serves as an identifier of a chapter (e.g., track).

The user device 615 may access the database 610 via a network (not shown). For example, a user may insert a disc (e.g., CD) into the user device 615 while the user device 615 is coupled to the network. The server 605 is configured for receiving, from a user device 615, a chapter (e.g., track) and a query about the chapter. The query is a request to receive particular data related to the chapter. The server 605 preferably generates a fingerprint of the chapter received from the user device 615. In an alternative embodiment, the server 605 receives, from the user device 615, the fingerprint for the chapter.

The server 605 is configured for generating a hash value by applying a hash function to at least a portion of the fingerprint. The hash function is preferably applied to the fingerprint in substantially the same manner that the hash function is applied to fingerprints from the database 610. For example, the hash function is preferably applied to the portion of the fingerprint at a substantially similar or same location as the hash function is applied to a portion of each of the fingerprints from the database 610. It is important that the hash function is applied in a substantially similar manner because, otherwise, the server 605 would not be able to find a matching hash value in the database 610.

The server 605 may then lookup, in the database 610, a matching hash value for the hash value. The database 610 preferably includes preexisting hash values 625 that are previously generated, as described above with reference to FIG. 2. The matching hash value may or may not exist in the database 610.

If the server 605 successfully looks up a match, then the matching hash value in the database 610 may be associated with data related to a matching chapter. The related data may be, for example, metadata that describes the contents of a digital audio, visual, and/or video recording. Metadata may include without limitation track title, artist name, producer name, and/or genre (e.g., classical, rock, jazz, hip-hop). The server 605 is configured for receiving data related to the matching chapter. The application is configured for sending, to the user device 615, the data related to the matching chapter. The user device 615 may then display the data related to the matching chapter.

Alternatively, the user device 615 may perform a more comprehensive download of data from the database 610 to the user device 510. While the user device 615 is offline, the user device 615 may then provide relevant data according to a recognized hash value in the user device 615. For example, the user may insert a disc while the user device 615 is offline from the network. The disc may be, for example, a CD. The user device 615 may then provide the relevant data by locating the appropriate hash value in the user device 615. The user device 615 may also retrieve, from the user device 615, the relevant data about a chapter upon receiving a user's manual request.

Overview of Method for Matching a Hash Value for a Fingerprint

Figure 7:
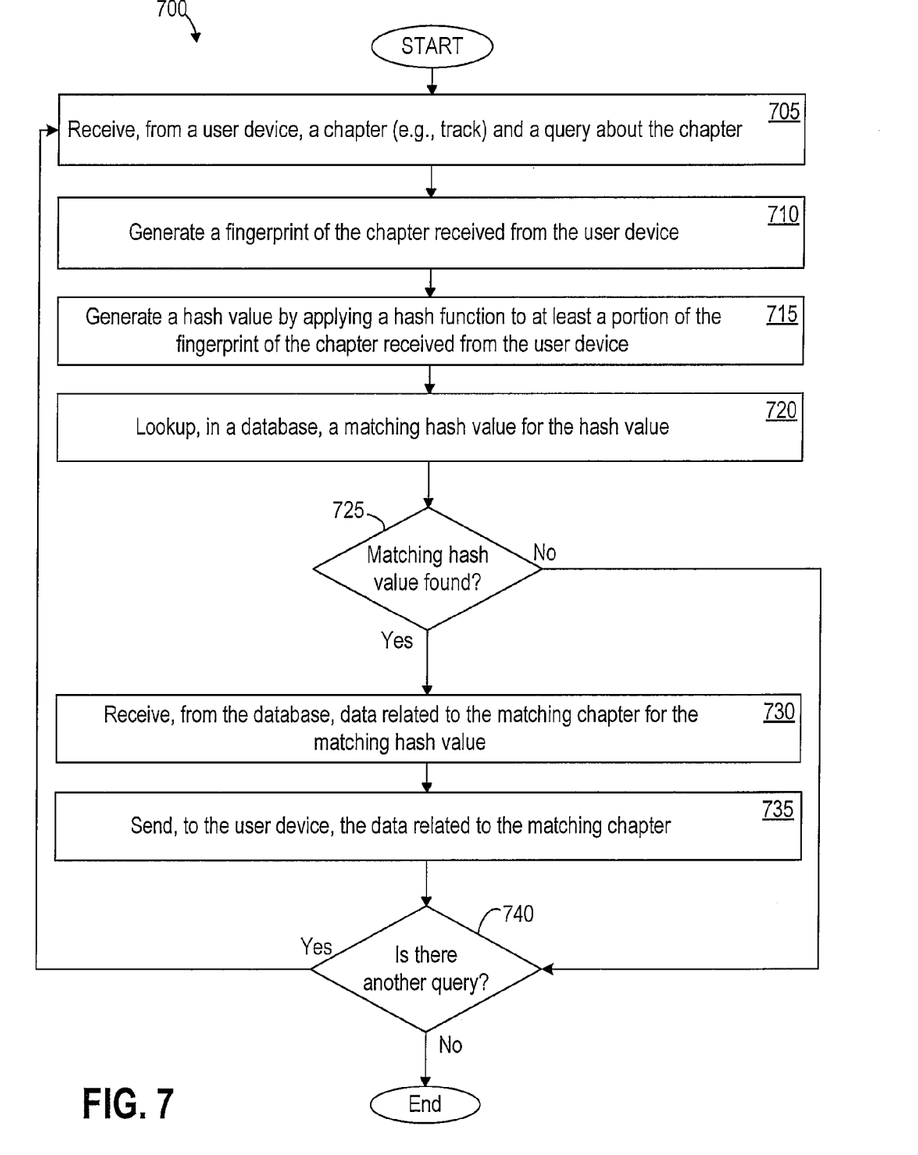
FIG. 7 is a flowchart of a method for matching a hash value for a fingerprint, in accordance with some embodiments.

FIG. 7 is a flowchart of a method 700 for matching a hash value for a fingerprint, in accordance with some embodiments. In some implementations, the steps of the method 700 may be carried out by the server 505 of FIG. 5. In an implementation, the method 700 of FIG. 7 operates in a real-time and/or unscheduled mode.

The method 700 starts in a step 705 where the system receives, from a user device, a chapter (e.g., track) and a query about the chapter. The method 700 then moves to a step 710 where the system generates a fingerprint of the chapter received from the user device. Next, in a step 715, the system generates a hash value by applying a hash function to at least a portion of the fingerprint of the chapter received from the user device. The hash value is an identifier for the chapter. Then, in a step 720, the system looks up (or attempts to lookup), in a database, a matching hash value for the hash value. Note that the system preferably looks up (or attempts to look up) a matching hash value among preexisting hash values that are previously generated, as described above with reference to FIG. 2. If the database does not include preexisting hash values for fingerprints, then the system may generate hash values for the fingerprints, as described above with reference to FIG. 2.

Next, in a decision operation 725, the system determines if there is a matching hash value found in the database. It is possible that there is no matching hash value in the database. If there is no matching hash value in the database, then the method 700 skips ahead to a decision operation 740. However, if the system determines in decision operation 725 that a matching hash value is in the database, then the method 700 proceeds to a step 730. In step 730, the system receives, from the database, data related to a matching chapter for the matching hash value. Then, in a step 735, the system sends, to the user device, the data related to the matching chapter.

The method then proceeds to the decision operation 740 where the system determines if there is another query from a user device. For example, a user may insert another disc into a computer for a track to be recognized. If there is another query from a user device, then the method 700 returns to the step 705 where the system receives another chapter (e.g., track) and a query about the chapter. However, if the system determines in decision operation 740 that there is not another query from a user device, then the method 700 concludes after decision operation 740.

Note that this method 700 may include other details and steps that are not discussed in this method overview. Other details and steps are discussed above with reference to the appropriate figures and may be a part of the method 700, depending on the embodiment.

III

Computer Readable Medium Implementation

Figure 8:
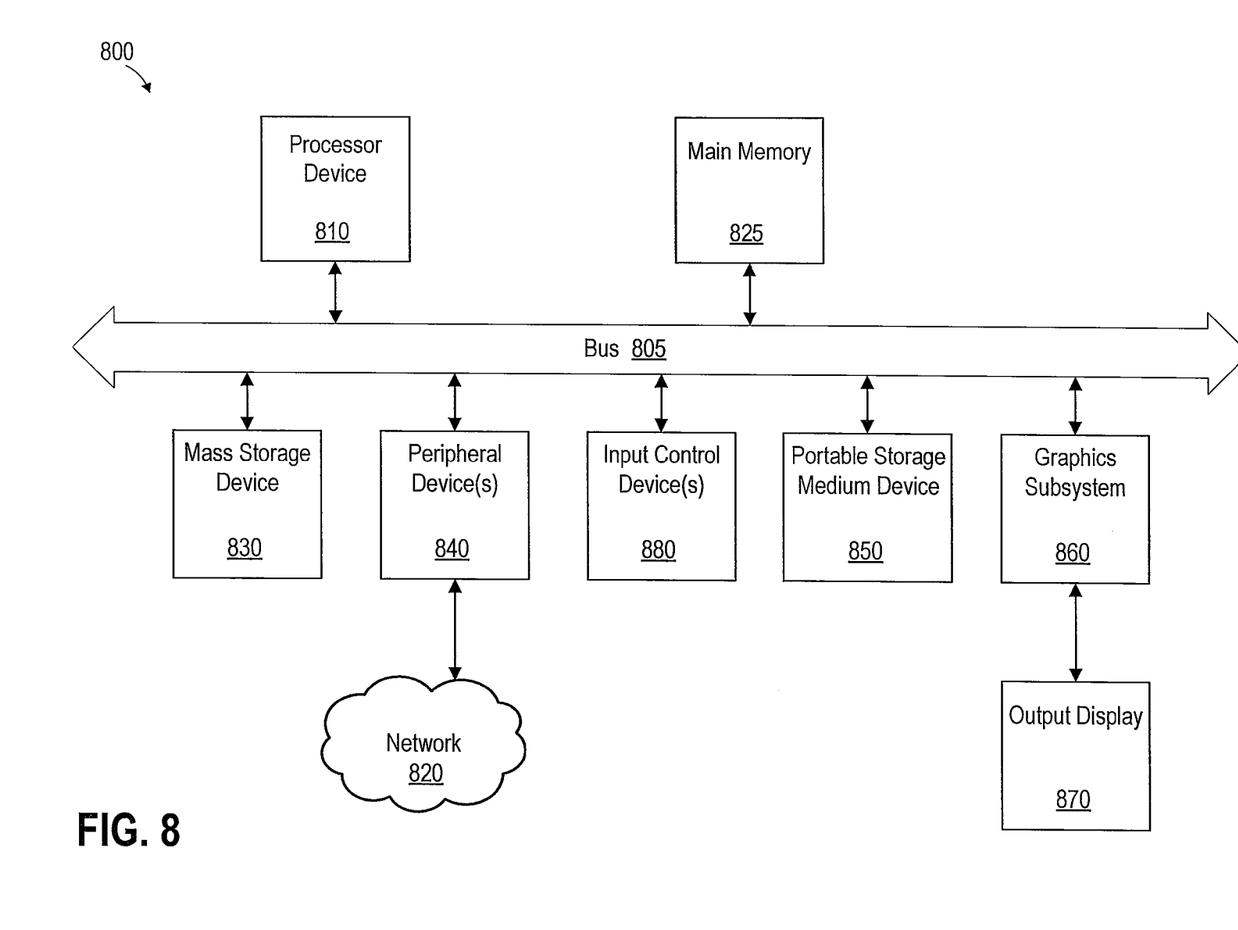
FIG. 8 is a block diagram of a general and/or special purpose computer system, in accordance with some embodiments.

FIG. 8 is a block diagram of a general and/or special purpose computer system 800, in accordance with some embodiments. The computer system 800 may be, for example, a user device, a user computer, a client computer and/or a server computer, among other things. Examples of a user device include without limitation a Blu-ray Disc player, a personal media device, a portable media player, an iPod™, a Zune™ Player, a laptop computer, a palmtop computer, a smart phone, a cell phone, a mobile phone, an mp3 player, a digital audio recorder, a digital video recorder, a CD player, a DVD player, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

The computer system 800 preferably includes without limitation a processor device 810, a main memory 825, and an interconnect bus 805. The processor device 810 may include without limitation a single microprocessor, or may include a plurality of microprocessors for configuring the computer system 800 as a multi processor system. The main memory 825 stores, among other things, instructions and/or data for execution by the processor device 810. If the system for generating a synthetic table of contents is partially implemented in software, the main memory 825 stores the executable code when in operation. The main memory 825 may include banks of dynamic random access memory (DRAM), as well as cache memory.

The computer system 800 may further include a mass storage device 830, peripheral device(s) 840, portable storage medium device(s) 850, input control device(s) 880, a graphics subsystem 860, and/or an output display 870. For explanatory purposes, all components in the computer system 800 are shown in FIG. 8 as being coupled via the bus 805. However, the computer system 800 is not so limited. Devices of the computer system 800 may be coupled through one or more data transport means. For example, the processor device 810 and/or the main memory 825 may be coupled via a local microprocessor bus. The mass storage device 830, peripheral device(s) 840, portable storage medium device(s) 850, and/or graphics subsystem 860 may be coupled via one or more input/output (I/O) buses. The mass storage device 840 is preferably a nonvolatile storage device for storing data and/or instructions for use by the processor device 810. The mass storage device 830, which may be implemented, for example, with a magnetic disk drive or an optical disk drive. In a software embodiment, the mass storage device 830 is preferably configured for loading contents of the mass storage device 830 into the main memory 825.

The portable storage medium device 850 operates in conjunction with a nonvolatile portable storage medium, such as, for example, a compact disc read only memory (CD ROM), to input and output data and code to and from the computer system 800. In some embodiments, the software for generating a synthetic table of contents may be stored on a portable storage medium, and may be inputted into the computer system 800 via the portable storage medium device 850. The peripheral device(s) 840 may include any type of computer support device, such as, for example, an input/output (I/O) interface configured to add additional functionality to the computer system 800. For example, the peripheral device(s) 840 may include a network interface card for interfacing the computer system 800 with a network 820.

The input control device(s) 880 provide a portion of the user interface for a user of the computer system 800. The input control device(s) 880 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 800 preferably includes the graphics subsystem 860 and the output display 870. The output display 870 may include a cathode ray tube (CRT) display and/or a liquid crystal display (LCD). The graphics subsystem 860 receives textual and graphical information, and processes the information for output to the output display 870.

Each component of the computer system 800 may represent a broad category of a computer component of a general and/or special purpose computer. Components of the computer system 800 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments may also be implemented by the preparation of application-specific integrated circuits or by interconnecting an appropriate network of conventional component circuits.

Some embodiments include a computer program product. The computer program product may be a storage medium and/or media having instructions stored thereon and/or therein which can be used to control, or cause, a computer to perform any of the processes of the invention. The storage medium may include without limitation floppy disk, mini disk, optical disc, Blu-ray Disc, DVD, CD-ROM, microdrive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer readable medium and/or media, some implementations include software for controlling both the hardware of the general and/or special computer or microprocessor, and for enabling the computer or microprocessor to interact with a human user or other mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above. The processes described above may include without limitation the following: receiving, from a user device, a chapter and a query about the chapter; generating, at a computer, a fingerprint of the chapter; generating, at a computer, a hash value of the fingerprint by applying a hash function to at least a portion of the fingerprint of the chapter; and looking up (or attempting to lookup), in a database system, a matching hash value for the hash value of the fingerprint.

ADVANTAGES

Searching for data related to a chapter (e.g., track, etc.) is substantially more efficient with use of hash values for fingerprints. For example, looking up a matching hash value is substantially more efficient than searching for the fingerprint that corresponds to the matching hash value. A hash value is standardized in format and substantially smaller than the corresponding fingerprint of the chapter. For example, a hash value may contain substantially fewer bits than bits contained in the fingerprint corresponding to the hash value. Also, a hash value typically includes a consistent number of bits that are represented in a standardized format, such as, for example, a 32-bit hexadecimal format or another standardized format. Accordingly, the system is streamlined because the system is configured for looking up identifiers (e.g., hash values) that are standardized in format and substantially smaller than their corresponding fingerprints.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for matching a fingerprint, wherein the method is configured to be carried out by at least one computer, the method comprising:
   receiving, from a user device, a chapter and a query about the chapter, wherein the chapter includes computer readable data generated from a waveform of an audio signal, and wherein the query is a request to receive data related to the chapter;
   generating a fingerprint of the chapter, wherein the fingerprint includes at least a digital measure of certain properties of the waveform of the audio signal;
   generating a hash value of the fingerprint by applying a hash function to at least a portion of the fingerprint of the chapter, wherein the hash value serves as an identifier for the chapter;
   determining a matching hash value for the hash value of the generated fingerprint from among hash values in a database system, by performing a hash lookup in the database system, the matching hash value being associated with data related to the chapter;
   receiving, from the database system, the data related to the chapter that is associated with the determined matching hash value, the data related to the chapter being received by using a non-fingerprint identifier for the chapter; and
   sending, to the user device, the received data.

2. The method of claim 1, wherein the database system includes preexisting hash values that are generated by performing at least one of:
   receiving one or more fingerprints; and
   generating a hash value for each of the one or more fingerprints by applying the hash function to at least a portion of each of the one or more fingerprints.

3. The method of claim 2, wherein the one or more fingerprints are received from at least one of:
   the database system; and
   one or more user devices.

4. The method of claim 1, wherein the hash function is applied to the portion of the fingerprint by using at least one of:
   applying, in a substantially similar manner, the hash function to a portion of each of the one or more fingerprints from the database system; and
   applying, in a substantially similar location, the hash function to a portion of each of the one or more fingerprints from the database system.

5. The method of claim 1, wherein the fingerprint includes a fuzzy representation of an audio waveform generated by applying a Fast Fourier Transform to the frequency spectrum contained within the audio waveform.

6. The method of claim 1, wherein the determining the matching hash value is substantially more efficient than searching for the fingerprint that corresponds to the matching hash value.

7. The method of claim 6, wherein the determining the matching hash value is substantially more efficient because a hash value is at least one of:
   substantially smaller than a fingerprint corresponding to the hash value;
   comprising fewer bits than a number of bits used to represent a fingerprint corresponding to the hash value;
   a number that is represented in a standardized format;
   a 128-bit value; and
   a 32-bit hexadecimal number.

8. The method of claim 1, wherein the hash function includes at least one of:
   a Message-Digest Algorithm;
   a Message-Digest Algorithm 2;
   a Message-Digest Algorithm 3;
   a Message-Digest Algorithm 4;
   a Message-Digest Algorithm 5; and
   a Message-Digest Algorithm 6.

9. The method of claim 1, wherein the data related to the chapter includes at least one of:
   metadata related to the chapter;
   a track title;
   an artist name;
   a producer name; and
   a genre.

10. The method of claim 1, wherein the user device is at least one of:
   a laptop computer;
   a CD player;
   a DVD player;
   a Blu-ray Disc player;
   a smart phone;
   a cell phone;
   a personal media device;
   a portable media player;
   an iPod;
   a Zune Player;
   a palmtop computer;
   a mobile phone;

an mp3 player;
a digital audio recorder; and
a digital video recorder.

11. The method of claim 1, wherein the hash function is a message digest algorithm and the data related to the chapter that is associated with the matching hash value is metadata related to the chapter.

12. The method of claim 1, wherein the non-fingerprint identifier for the chapter includes at least one of the hash value generated from the fingerprint, an audio identifier, a video identifier, a disc identifier, a CD identifier, a DVD identifier, a Blu-ray Disc identifier, a media identifier, a high definition media identifier, a handwritten signature, an eye print, a biometric identifier, a retinal identifier, a retinal scan, a DNA identifier, a DNA profile, a genetic identifier, and a genetic profile.

13. The method of claim 1, wherein receiving the data related to the chapter is performed without reading a fingerprint corresponding to the matching hash value.

14. The method of claim 13, wherein the hash lookup is performed without reading a fingerprint corresponding to the matching hash value.

15. A system for matching a fingerprint, wherein the system is configured for:
    receiving, from a user device, a chapter and a query about the chapter, wherein the chapter includes computer readable data generated from a waveform of an audio signal, and wherein the query is a request to receive data related to the chapter;
    generating a fingerprint of the chapter, wherein the fingerprint includes at least a digital measure of certain properties of the waveform of the audio signal;
    generating a hash value of the fingerprint by applying a hash function to at least a portion of the fingerprint of the chapter, wherein the hash value serves as an identifier for the chapter;
    determining a matching hash value for the hash value of the generated fingerprint from among hash values in a database system, by performing a hash lookup in the database system, the matching hash value being associated with data related to the chapter;
    receiving, from the database system, the data related to the chapter that is associated with the determined matching hash value, the data related to the chapter being received by using a non-fingerprint identifier for the chapter; and
    sending, to the user device, the received data.

16. The system of claim 15, wherein the database system includes preexisting hash values that are generated by performing at least one of:
    receiving one or more fingerprints; and
    generating a hash value for each of the one or more fingerprints by applying the hash function to at least a portion of each of the one or more fingerprints.

17. The system of claim 16, wherein the one or more fingerprints are received from at least one of:
    the database system; and
    one or more user devices.

18. The system of claim 15, wherein the system applies the hash function to the portion of the fingerprint by using at least one of:
    a substantially similar manner that the hash function is applied to a portion of each of the one or more fingerprints from the database system; and
    a substantially similar location that the hash function is applied to a portion of each of the one or more fingerprints from the database system.

19. The system of claim 15, wherein the fingerprint includes a fuzzy representation of an audio waveform generated by applying a Fast Fourier Transform to the frequency spectrum contained within the audio waveform.

20. The system of claim 15, wherein the determining the matching hash value is substantially more efficient than searching for the fingerprint that corresponds to the matching hash value.

21. The system of claim 20, wherein the determining the matching hash value is substantially more efficient because a hash value is at least one of:
    substantially smaller than a fingerprint corresponding to the hash value;
    comprises fewer bits than a number of bits used to represent a fingerprint corresponding to the hash value;
    a number that is represented in a standardized format;
    a 128-bit value; and
    a 32-bit hexadecimal number.

22. The system of claim 15, wherein the hash function includes at least one of:
    a Message-Digest Algorithm;
    a Message-Digest Algorithm 2;
    a Message-Digest Algorithm 3;
    a Message-Digest Algorithm 4;
    a Message-Digest Algorithm 5; and
    a Message-Digest Algorithm 6.

23. The system of claim 15, wherein the data related to the chapter includes at least one of:
    metadata related to the chapter;
    a track title;
    an artist name;
    a producer name; and
    a genre.

24. The method of claim 15, wherein the user device is at least one of:
    a laptop computer;
    a CD player;
    a DVD player;
    a Blu-ray Disc player;
    a smart phone;
    a cell phone;
    a personal media device;
    a portable media player;
    an iPod;
    a Zune Player;
    a palmtop computer;
    a mobile phone;
    an mp3 player;
    a digital audio recorder; and
    a digital video recorder.

25. The system of claim 15, wherein the hash function is a message digest algorithm and the data related to the chapter that is associated with the matching hash value is metadata related to the chapter.

26. The system of claim 15, wherein the non-fingerprint identifier for the chapter includes at least one of the hash value generated from the fingerprint, an audio identifier, a video identifier, a disc identifier, a CD identifier, a DVD identifier, a Blu-ray Disc identifier, a media identifier, a high definition media identifier, a handwritten signature, an eye print, a biometric identifier, a retinal identifier, a retinal scan, a DNA identifier, a DNA profile, a genetic identifier, and a genetic profile.

27. The system of claim 15, wherein receiving the data related to the chapter is performed without reading a fingerprint corresponding to the matching hash value.

28. The system of claim 27, wherein the hash lookup is performed without reading a fingerprint corresponding to the matching hash value.

29. A computer readable medium comprising one or more instructions for matching a fingerprint, wherein the one or more instructions are configured to cause one or more processors to perform the steps of:

receiving, from a user device, a chapter and a query about the chapter, wherein the chapter includes computer readable data generated from a waveform of an audio signal, and wherein the query is a request to receive data related to the chapter;

generating a fingerprint of the chapter, wherein the fingerprint includes at least a digital measure of certain properties of the waveform of the audio signal;

generating a hash value of the fingerprint by applying a hash function to at least a portion of the fingerprint of the chapter, wherein the hash value serves as an identifier for the chapter;

determining a matching hash value for the hash value of the generated fingerprint from among hash values in a database system, by performing a hash lookup in the database system, the matching hash value being associated with data related to the chapter;

receiving, from the database system, the data related to the chapter that is associated with the determined matching hash value, the data related to the chapter being received by using a non-fingerprint identifier for the chapter; and sending, to the user device, the received data.

30. The computer readable medium of claim 29, wherein the hash function is a message digest algorithm and the data related to the chapter that is associated with the matching hash value is metadata related to the chapter.

31. The computer readable medium of claim 29, wherein the non-fingerprint identifier for the chapter includes at least one of the hash value generated from the fingerprint, an audio identifier, a video identifier, a disc identifier, a CD identifier, a DVD identifier, a Blu-ray Disc identifier, a media identifier, a high definition media identifier, a handwritten signature, an eye print, a biometric identifier, a retinal identifier, a retinal scan, a DNA identifier, a DNA profile, a genetic identifier, and a genetic profile.

32. The computer readable medium of claim 29, wherein receiving the data related to the chapter is performed without reading a fingerprint corresponding to the matching hash value.

33. The computer readable medium of claim 32, wherein the hash lookup is performed without reading a fingerprint corresponding to the matching hash value.

\* \* \* \* \*